US012765525B1

(12) United States Patent
Hines

(10) Patent No.: US 12,765,525 B1
(45) Date of Patent: Oct. 20, 2026

(54) HYBRID TWO-SEGMENT FISHING LURE WITH HARD TAIL CRANKBAIT COMPONENT AND SOFT HEAD REALISTIC MOVEMENT COMPONENT

(71) Applicant: Blake Hines, Denver, CO (US)

(72) Inventor: Blake Hines, Denver, CO (US)

( * ) Notice: Subject to any disclaimer, the term of this patent is extended or adjusted under 35 U.S.C. 154(b) by 0 days.

(21) Appl. No.: 19/389,192

(22) Filed: Nov. 14, 2025

(51) Int. Cl.
*A01K 85/00* (2006.01)

(52) U.S. Cl.
CPC ...... *A01K 85/1807* (2022.02); *A01K 85/1813* (2022.02); *A01K 85/1841* (2022.02); *A01K 85/1847* (2022.02)

(58) Field of Classification Search
CPC ................ A01K 85/18; A01K 85/1803; A01K 85/1823; A01K 85/1827
USPC ........................................................ 43/42.09
See application file for complete search history.

(56) References Cited

U.S. PATENT DOCUMENTS 1,813,722 A * 7/1931 Wright .................. A01K 85/16 43/42.34
2,787,076 A * 4/1957 Kring .................... A01K 85/16 43/42.22
2,819,553 A * 1/1958 Fultz ...................... A01K 85/16 43/42.49
3,438,144 A * 4/1969 Lincoln .................. A01K 85/18 43/42.34
4,176,490 A 12/1979 Philips
4,771,567 A * 9/1988 Cannon .................. A01K 85/00 43/42.26
4,870,775 A 10/1989 Schrader
5,299,379 A 4/1994 Hawk
5,331,762 A 7/1994 Banks
6,164,006 A 12/2000 Peterson
6,857,220 B2 2/2005 King
7,316,095 B1 1/2008 Petner et al.
7,484,327 B2 * 2/2009 Moore .................. A01K 85/00 43/42.28
7,627,978 B2 12/2009 Davis
D619,197 S 7/2010 Anderson et al.
8,490,319 B2 7/2013 Mancini et al.
8,646,203 B2 2/2014 Pennaz
8,776,428 B2 7/2014 Langer
9,345,237 B2 5/2016 Rapelje
9,474,257 B1 * 10/2016 McGilvry ............. A01K 85/02
D861,122 S 9/2019 Spengler et al.
10,701,915 B2 7/2020 Herring
2002/0104251 A1 8/2002 Prescott
(Continued)

*Primary Examiner* — Christopher P Ellis
(74) *Attorney, Agent, or Firm* — Whiteford, Taylor & Preston, LLP

(57) ABSTRACT

A hybrid fishing lure comprises a hard tail segment constructed from rigid plastic material with an integrated diving lip and aperture for fishing line attachment, and a soft head segment constructed from flexible plastic material that attaches to the hard segment through a press-fit and flared connection mechanism. The hard tail segment provides buoyancy control characteristics causing the lure to float without line tension and suspend when tension is applied, while generating side-to-side motion during retrieval. The soft head segment provides realistic appearance and natural swimming motion simulation. This two-segment construction eliminates the compromise between lure functionality and realistic presentation by combining controlled diving and suspension capabilities with lifelike movement characteristics.

16 Claims, 10 Drawing Sheets

(56) References Cited

U.S. PATENT DOCUMENTS

| | | | | |
|---|---|---|---|---|
| 2006/0260176 | A1 | 11/2006 | Yeung | |
| 2012/0102815 | A1* | 5/2012 | Hughes | A01K 85/18<br>43/42.26 |
| 2017/0000097 | A1 | 1/2017 | Thomas | |
| 2018/0125046 | A1* | 5/2018 | Coonrod | A01K 85/02 |
| 2020/0352148 | A1* | 11/2020 | Mancini | A01K 85/01 |
| 2021/0076650 | A1* | 3/2021 | Bingham | A01K 85/18 |
| 2023/0329204 | A1* | 10/2023 | Craven | A01K 85/1827 |
| 2025/0064037 | A1* | 2/2025 | Zhao | A01K 85/18 |

* cited by examiner

HYBRID TWO-SEGMENT FISHING LURE WITH HARD TAIL CRANKBAIT COMPONENT AND SOFT HEAD REALISTIC MOVEMENT COMPONENT

FIELD OF THE INVENTION

The present invention relates to fishing lures, and more particularly to a hybrid fishing lure that combines the realistic appearance and movement characteristics of soft plastic lures with the functional diving and suspension capabilities of hard plastic crankbaits.

BACKGROUND OF THE INVENTION

Two of the primary types of fishing lures are hard lures and soft lures, each having distinct advantages and disadvantages that limit their overall effectiveness.

Hard plastic lures, particularly crankbaits, offer significant functional advantages in terms of lure control and fish attraction. Crankbaits are equipped with a lip that causes them to dive and vibrate in the water, with the length of the lip determining the diving depth. These lures provide the ability to control float and sink characteristics based on the tension applied to the fishing line, allowing anglers to precisely control the lure's position in the water column. Additionally, crankbaits exhibit a distinctive side-to-side motion during retrieval, which is a function of the bill design.

However, hard plastic lures suffer from a critical limitation: they lack realism in their appearance and movement. The rigid construction of hard plastic lures can fail to provide the lifelike presentation that fish find attractive, reducing their overall effectiveness as fishing tools.

Conversely, soft plastic lures offer superior realism in both appearance and movement. Soft crawdad baits, for example, feature realistic movement characteristics where "everything moves and it looks very realistic." The flexible nature of soft plastics allows these lures to mimic the natural swimming and escape behaviors of prey species more accurately than their hard counterparts.

Despite their realistic appearance, soft lures are significantly limited by their lack of functional capabilities. Soft lures cannot provide the controlled float and sink characteristics that are achievable with hard lures, as they lack the structural components necessary for line tension-based depth control. Furthermore, while hard lures generally lack realistic appearance and movement, they do provide one beneficial characteristic that soft lures cannot replicate: the mechanical side-to-side motion generated by crankbait bills. This wobbling action, though artificially generated, is particularly valuable because it can complement realistic crawdad presentation, as natural crawdads exhibit rapid tail-kicking movements and possess natural side-to-side motion during their escape behaviors.

This side-to-side motion is crucial for realistic crawdad presentation, as natural crawdads exhibit rapid, backward swimming motions characterized by quick, jerky movements of both their tail and legs when escaping from predators.

Natural crawdad escape behavior is characterized by rapid backward swimming motions where the tail leads the escape movement. During predator evasion, crawdads position their tails forward in the direction of movement and use powerful tail flips to propel themselves backwards through the water. This tail-first escape orientation is critical for effective predator avoidance and represents the primary swimming behavior that gamefish recognize when hunting crawdads. Understanding this natural behavior pattern is essential for developing realistic crawdad lure presentations that effectively trigger predatory responses.

There remains a need to solve the fundamental problem in the fishing lure industry where anglers must choose between the functional advantages of hard lures and the realistic presentation of soft lures. Specifically, there remains the problem of providing the presentation of soft plastic with the function of a hard plastic.

There remains need for anglers to compromise between lure functionality and realism by creating a hybrid solution that marries the realism benefits of a soft crawdad bait with the benefits of a (hard) crank bait. This relates to the long-standing industry problem where effective lure control and realistic fish attraction have been mutually exclusive characteristics in conventional lure designs.

SUMMARY OF THE INVENTION

The preferred embodiment of the present invention provides a hybrid fishing lure that combines the functional advantages of hard plastic crankbaits with the realistic appearance and movement characteristics of soft plastic lures, thereby solving the fundamental problem where anglers must choose between lure functionality and realistic fish presentation.

The hybrid fishing lure comprises a two-segment construction featuring a hard tail segment integrated with a soft head segment in accordance with various embodiments. The hard tail segment serves as the primary structural component, constructed from rigid plastic material that in one embodiment further comprises attachment points for hooks and incorporating an integrated diving lip with an aperture for fishing line attachment. This hard segment provides essential crankbait functionality, including controlled float and sink characteristics based on fishing line tension, where the lure floats without tension and suspends at lower levels or dives deeper when tension is applied. Additionally, the hard tail segment generates beneficial side-to-side motion during retrieval that accurately represents natural crawdad escape behavior where the tail leads during backward swimming movements, providing realistic crawdad presentation that mimics the natural tail-first orientation crawdads exhibit when escaping from predators.

The soft head segment comprises the secondary component constructed from flexible plastic material that fits over the rear portion of the hard tail segment through a press-fit attachment mechanism with a flared connection design. This soft segment provides the realistic appearance and natural movement characteristics typically associated with soft plastic lures, where appendages move naturally in a manner characteristic of realistic movements reflecting natural organisms.

The hard tail segment maintains watertight integrity through its internal air chamber construction to preserve buoyancy characteristics while allowing the soft segment's independent flexible movement, ensuring unified lure operation. The hybrid design eliminates the compromise between lure control and realistic presentation.

The invention in various embodiments encompasses various size configurations, with the medium size measuring approximately 1 inch wide by 3 inches long, and includes scalable small and large variants. Alternative embodiments extend beyond the primary crawdad configuration to include shad, bluegill, and other freshwater and saltwater representations of prey while maintaining the fundamental two-segment construction.

The hybrid fishing lure successfully marries the realism benefits of a soft crawdad bait construction with the benefits of a (hard) crank bait construction, providing anglers with a superior fishing tool that addresses long-standing limitations in conventional lure designs and delivers both functional lure control and realistic fish attraction in a single, integrated system.

DETAILED DESCRIPTION

The present invention relates to a preferred embodiment of a hybrid fishing lure that combines the functional advantages of hard plastic crankbaits with the realistic appearance and movement characteristics of soft plastic lures. This preferred embodiment represents a significant advancement in fishing lure technology by solving the long-standing problem of having to choose between lure functionality and realistic fish presentation.

Figure 1:
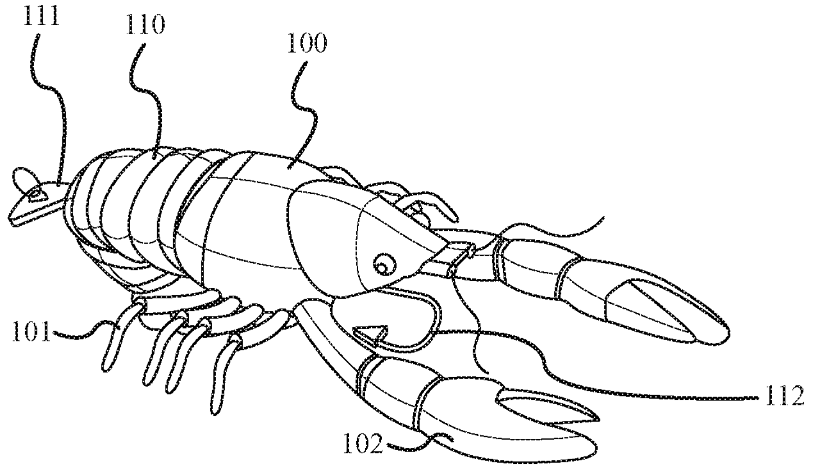
FIG. 1 is a perspective view of the hybrid fishing lure showing the hard tail segment with integrated diving lip and the soft head segment in a crawdad configuration in accordance with an embodiment of the invention.

FIG. 1 depicts a perspective view of the hybrid fishing lure in accordance with an embodiment of the invention. The lure comprises a soft head segment 100 constructed from flexible plastic material that provides realistic appearance and natural movement characteristics. The soft head segment 100 includes legs 101 and claws 102 that enhance the realistic detailing and mimic natural prey characteristics including appendages and segmented body sections. The hard tail segment 110 serves as the primary structural component constructed from rigid plastic material and incorporates an integrated diving lip 111 with an aperture for fishing line attachment. The hard tail segment 110 provides essential crankbait functionality including controlled float and sink characteristics based on fishing line tension. A hook 112 is positioned to accommodate the natural impact point for fish attacking the lure configuration.

Figure 2:
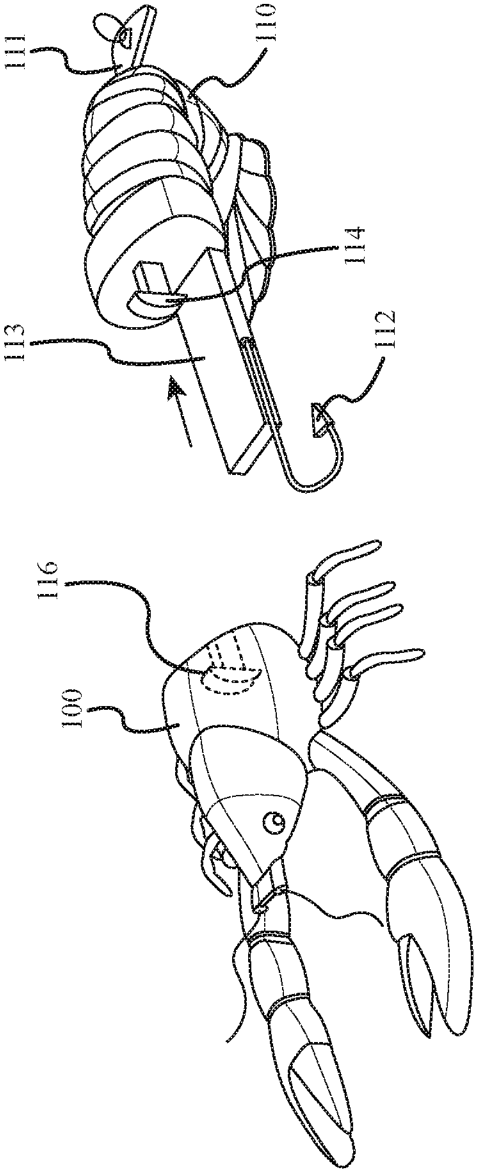
FIG. 2 is an exploded view of the hybrid fishing lure depicting the hard tail segment and soft head segment in separated form to illustrate the press-fit and flared connection mechanism in accordance with an embodiment of the invention.

FIG. 2 illustrates an exploded view of the hybrid fishing lure showing the hard tail segment 110 and soft head segment 100 in separated form to demonstrate the press-fit attachment mechanism with flared connection design in accordance with an embodiment of the invention. The hard tail segment 110 includes the integrated diving lip 111 and hook 112, while also showing a plank connector portion 113 and clip piece 114 that facilitate the secure coupling between segments. The soft head segment 100 with legs 101 is configured with internal dimensions that accommodate the rear portion of the hard tail segment through the press-fit attachment mechanism. 116 represents the connection interface area where the flared design expands the soft segment material around the hard segment to create secure attachment while maintaining unified lure operation.

Figure 3A:
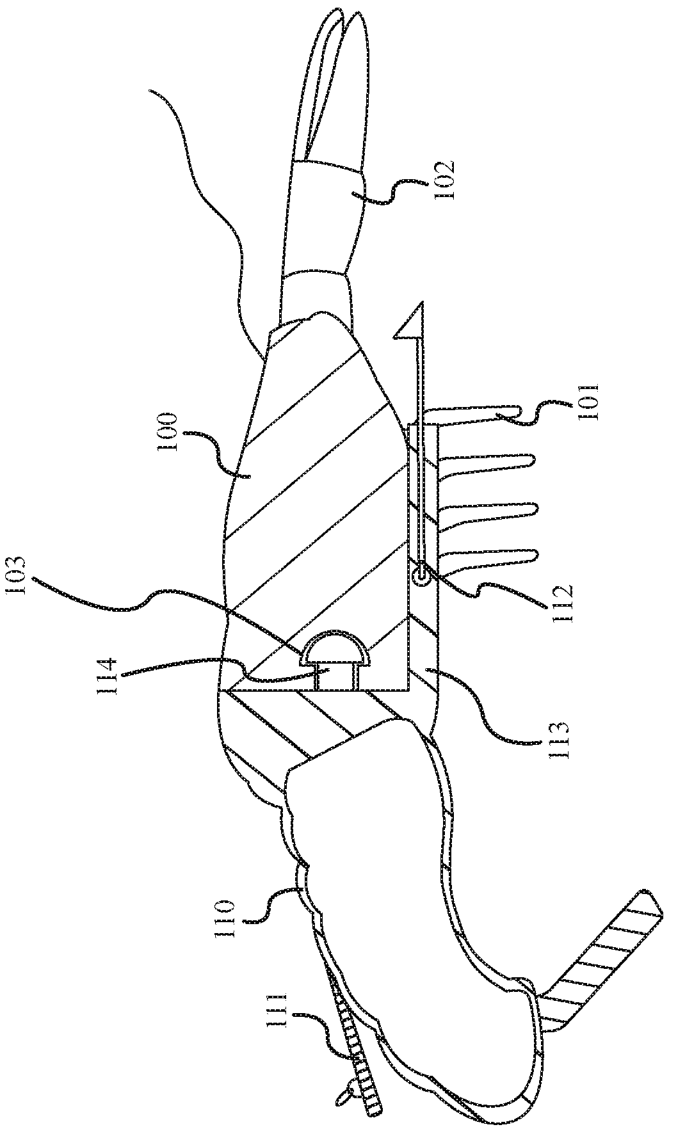
FIG. 3*a* is a cross-sectional representation of an exemplary embodiment demonstrating a configuration in accordance with a preferred embodiment.

FIG. 3*a* provides a cross-sectional representation of an exemplary embodiment demonstrating the primary configuration of the hybrid fishing lure in accordance with a preferred embodiment of the invention. This embodiment shows the soft head segment 100 with legs 101 and claws 102, and includes a clip hole 103 that facilitates attachment of the hard and soft segments. The hard tail segment 110 incorporates the integrated diving lip 111, hook 112, plank connector portion 113, and clip piece 114. This cross-sectional view demonstrates the standard flared connection mechanism where the soft segment material expands around the hard segment, creating multiple contact points that distribute attachment forces and prevent separation during use. The configuration shown provides direct structural continuity between the tail portion and the high point of the hard segment without any transitional elements, allowing the soft segment's independent flexible movement while maintaining unified lure operation for controlled diving and suspension characteristics.

Figure 3B:
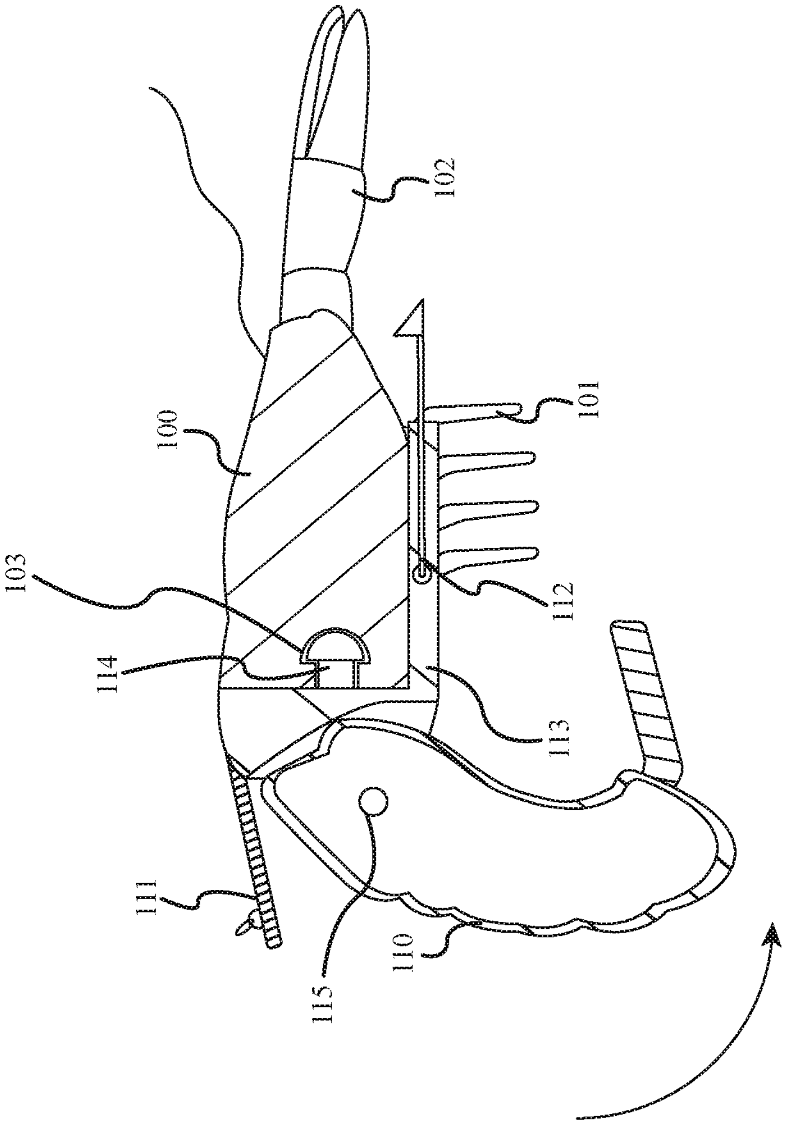
FIG. 3*b* is a cross-sectional view of the connection interface between the hard and soft segments showing the flared attachment design in accordance with an embodiment of the invention.

FIG. 3*b* provides a cross-sectional view of the connection interface between the hard and soft segments showing the flared attachment design in accordance with an embodiment of the invention featuring a hinged tail mechanism. This embodiment shows the soft head segment 100 with legs 101 and claws 102, and includes a clip hole 103 that facilitates attachment of the hard and soft segments. The hard tail segment 110 incorporates the integrated diving lip 111 positioned on the upper central portion of the lure, hook 112, plank connector portion 113, clip piece 114, and critically, a hinge mechanism 115 that serves as a pivot point. This cross-sectional view demonstrates the hinged connection that allows the tail portion to flip underneath the body during retrieval when line tension is applied, simulating the natural tail-under-body position that crawdads assume when escaping from predators. The flared connection mechanism maintains secure attachment between segments while enabling the hinged tail functionality that creates more realistic crawdad escape behavior during intermittent retrieve techniques.

Figure 4A:
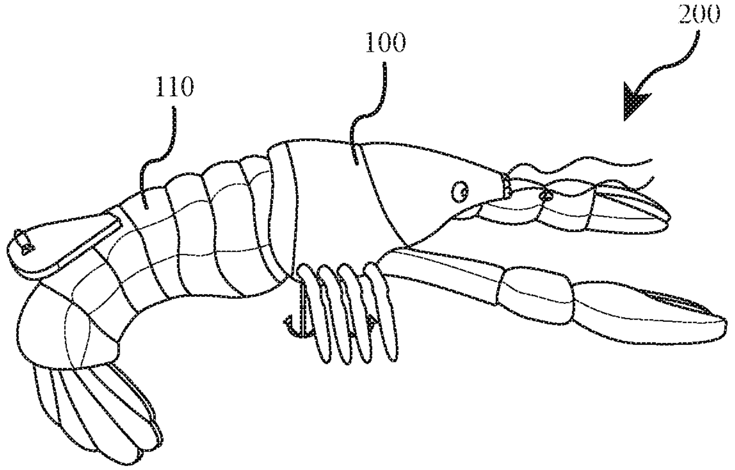
FIG. 4*a* depicts a side view of an embodiment in a crawdad configuration.
Figure 4B:
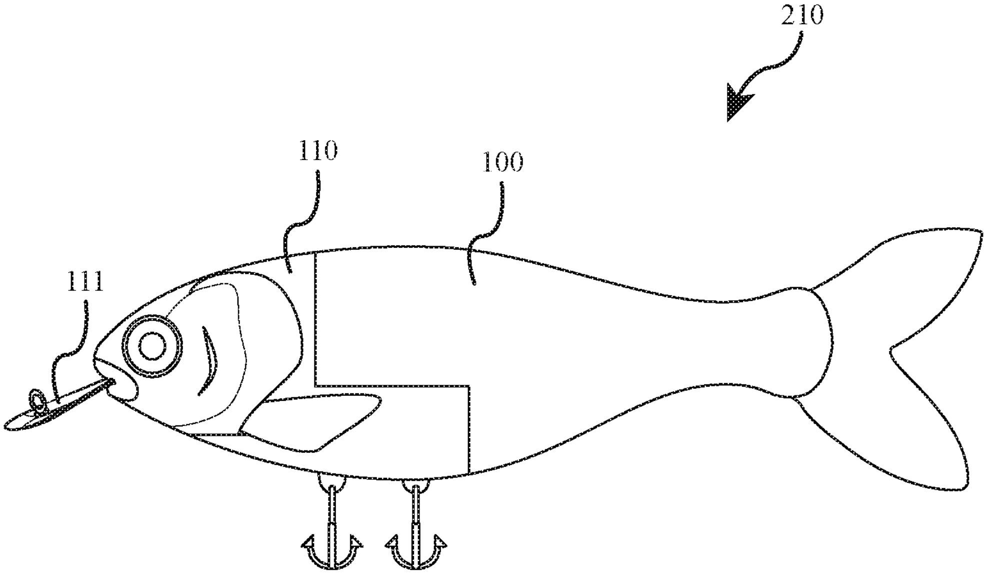
FIG. 4*b* depicts a side view of an embodiment in a shad configuration.

FIG. 4*a* depicts a side view of the hybrid fishing lure in a crawdad embodiment 200 in accordance with the invention. The crawdad embodiment 200 incorporates the soft head segment 100, hard tail segment 110, and integrated diving lip 111. This configuration leverages the invention's core two-segment construction to replicate the natural anatomy and movement characteristics of crawfish, which represent a primary food source for many gamefish species, while maintaining the functional advantages of the hybrid design.

FIG. **4*b* illustrates a side view of the hybrid fishing lure in a shad embodiment 210 that adapts the basic design principles to replicate the streamlined body shape and swimming characteristics of shad species. The shad embodiment 210 includes the hard tail segment 110, soft head segment 100, and integrated diving lip 111**. The shad configuration maintains the fundamental two-segment construction while adapting the specific anatomical details and proportional relationships appropriate to shad species representation.

Figure 4C:
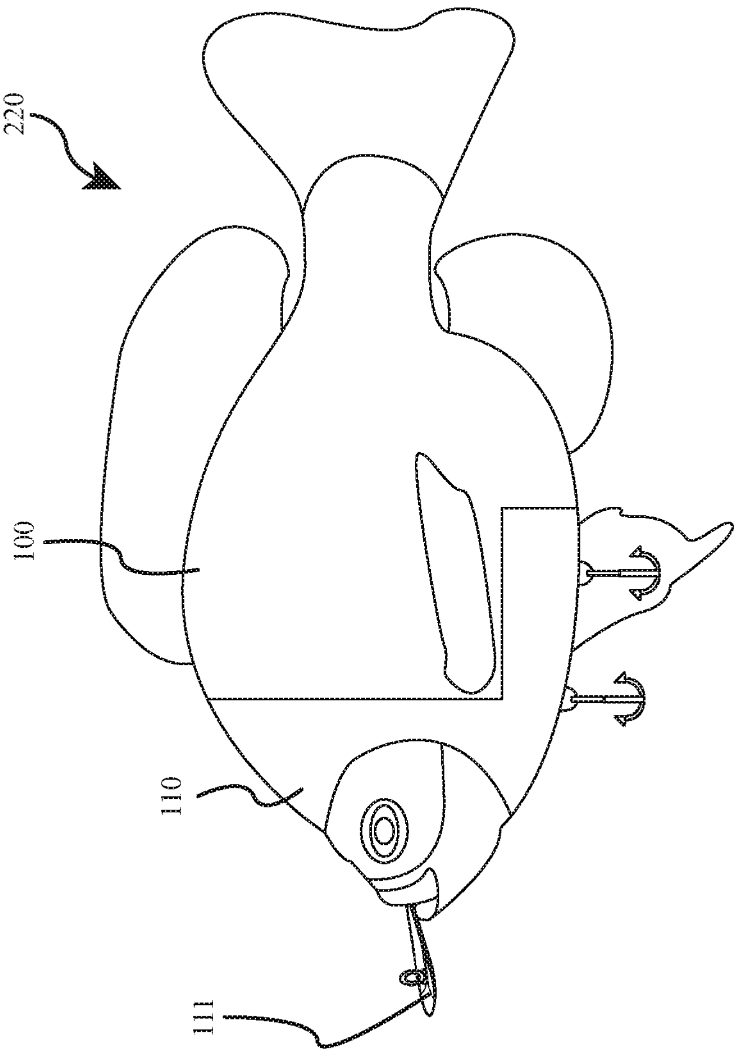
FIG. 4*c* depicts a side view of an embodiment in a bluegill configuration.
Figure 4D:
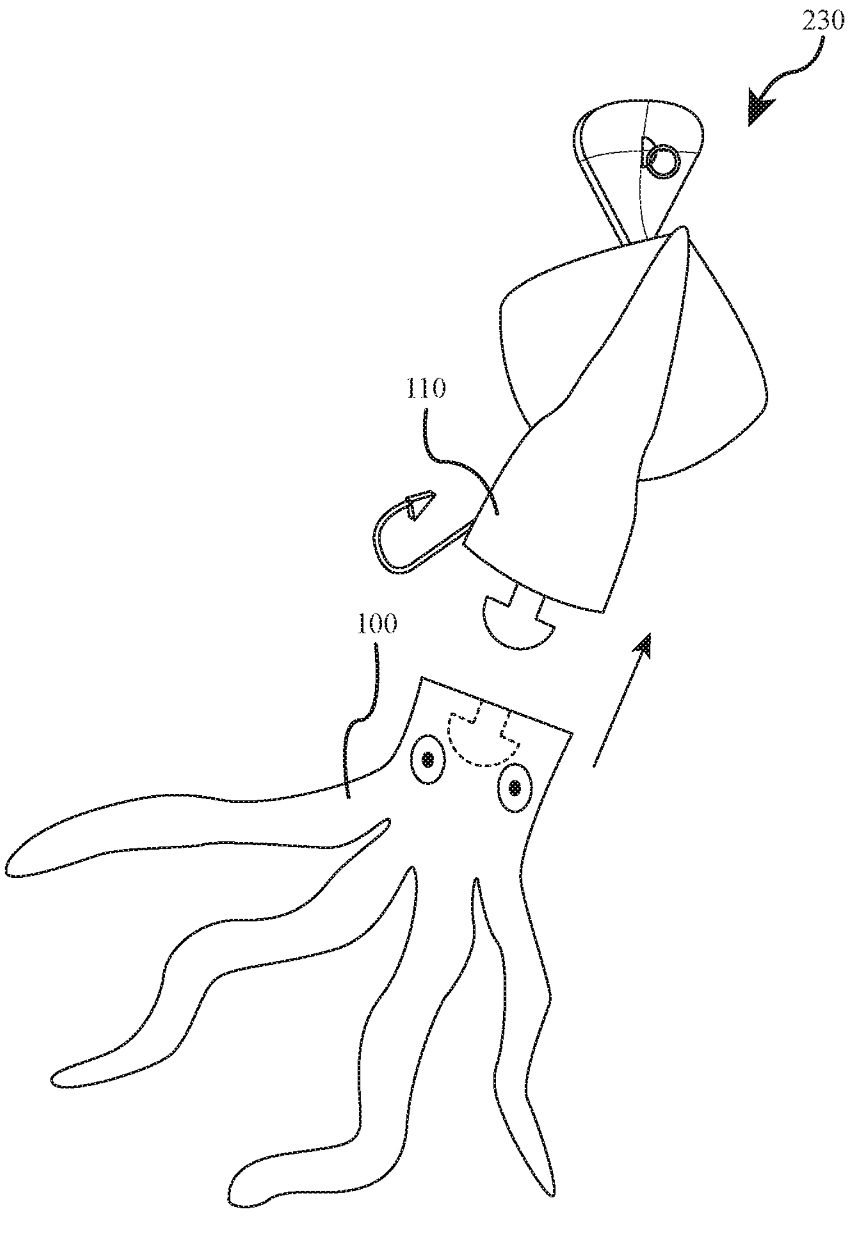
FIG. 4*d* depicts a side view of an embodiment in a squid configuration.
Figure 5A:
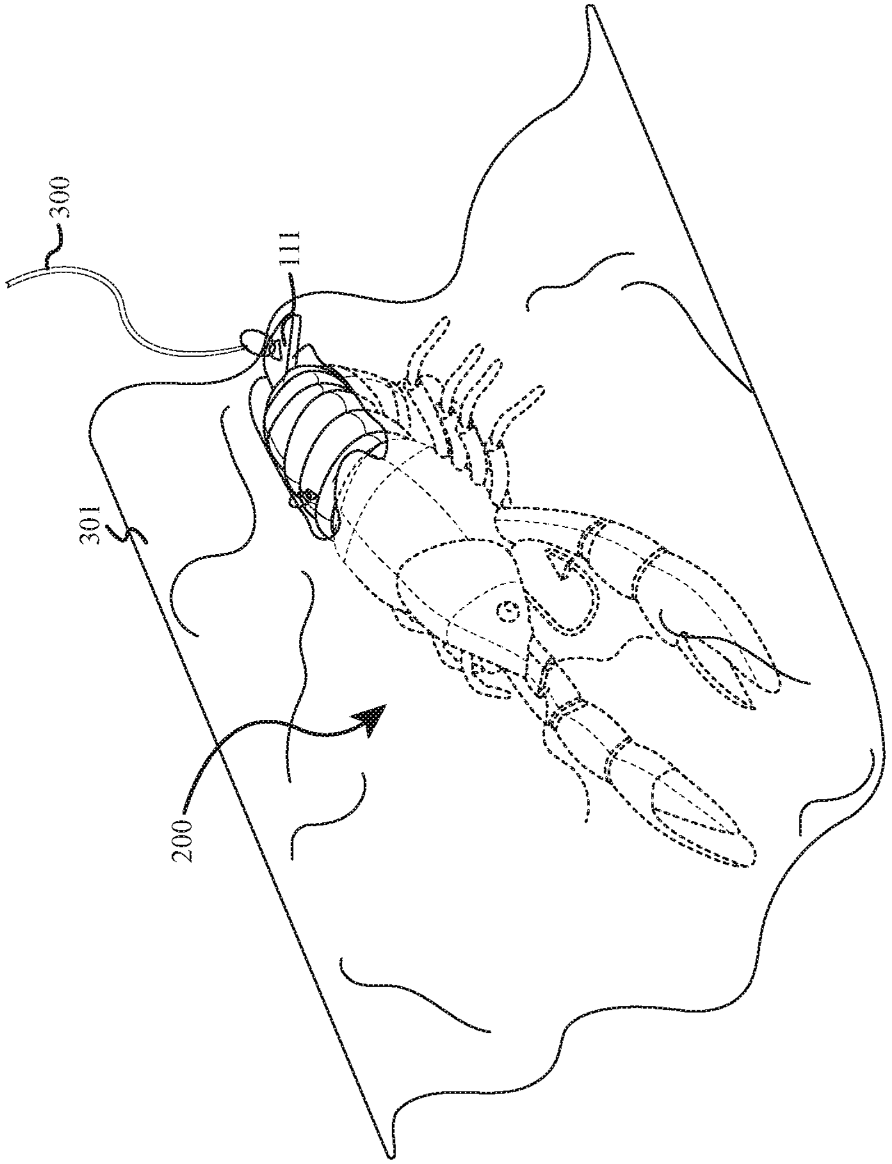
FIG. 5*a* illustrates the lure in a floating position without line tension applied in accordance with an embodiment of the invention.
Figure 5B:
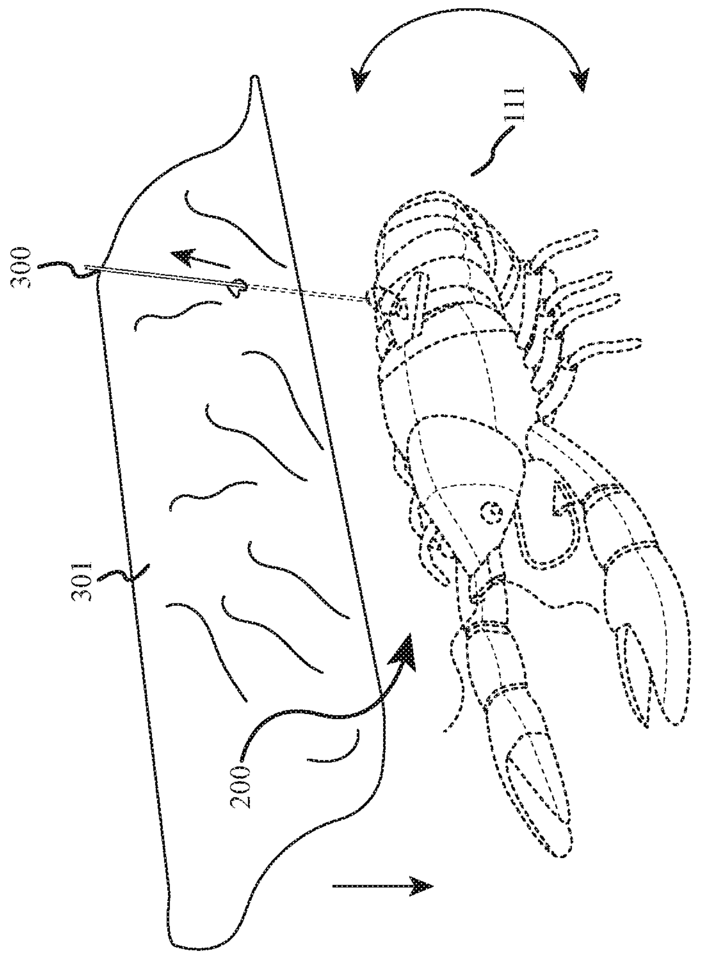
FIG. 5*b* illustrates the lure in a diving/suspended position with line tension applied, showing the operational characteristics of the diving lip in accordance with an embodiment of the invention.

FIG. **4*c* shows a side view of the hybrid fishing lure in a bluegill embodiment 220 that adapts the two-segment design to replicate the distinctive body shape and coloration patterns of bluegill and other panfish species. In alternative embodiments that are not resemblant of crawdads and not resemblant of shrimp, such as the shown bluegill embodiment 220, the head segment 100 may incorporate hard material, and the tail segment 110 may incorporate soft, as these creatures are known to swim head first in the wild. Regardless the integrated diving lip 111 is included as shown in the FIG. 4*c*** in accordance with various embodiments. This configuration maintains the core two-segment construction while providing species-specific anatomical details and movement characteristics that enhance realistic presentation for bluegill (and other analogous) prey types.

FIG. **4*d* depicts a side view of the hybrid fishing lure in a squid embodiment 230 that extends the inventive concept to saltwater prey species representations. The squid embodiment 230 includes the soft tail segment 110 and hard head segment 100**, reflecting the fact that in the wild a squid swims head first and thus enabling the lure to mimick that motion, and demonstrating the versatility of the basic design principles while preserving the fundamental functionality that provides the presentation of soft plastic with the function of hard plastic across diverse prey species configurations.

FIG. **5*a* illustrates the hybrid fishing lure in a floating position without line tension applied, showing the operational characteristics in accordance with an embodiment of the invention. The crawdad embodiment 200 with integrated diving lip 111 demonstrates the natural float characteristics where the hard tail segment's buoyancy properties cause the entire lure to remain at or near the water surface 301 when connected to fishing line 300**. This floating behavior allows anglers to present the lure in shallow water applications and provides the opportunity to work the lure over submerged vegetation or structure without snagging.

FIG. **5*b* depicts the hybrid fishing lure in a diving/suspended position with line tension applied to fishing line 300, demonstrating how the integrated diving lip 111 engages with water flow to cause the lure to dive and suspend at a lower level in water 301. The crawdad embodiment 200** shows the operational characteristics where applying tension to the fishing line causes the lip to engage and suspend the lure at a desired depth in the water column, providing precise depth control that is characteristic of hard plastic crankbaits but unavailable with traditional soft plastic lures.

Figure 6:
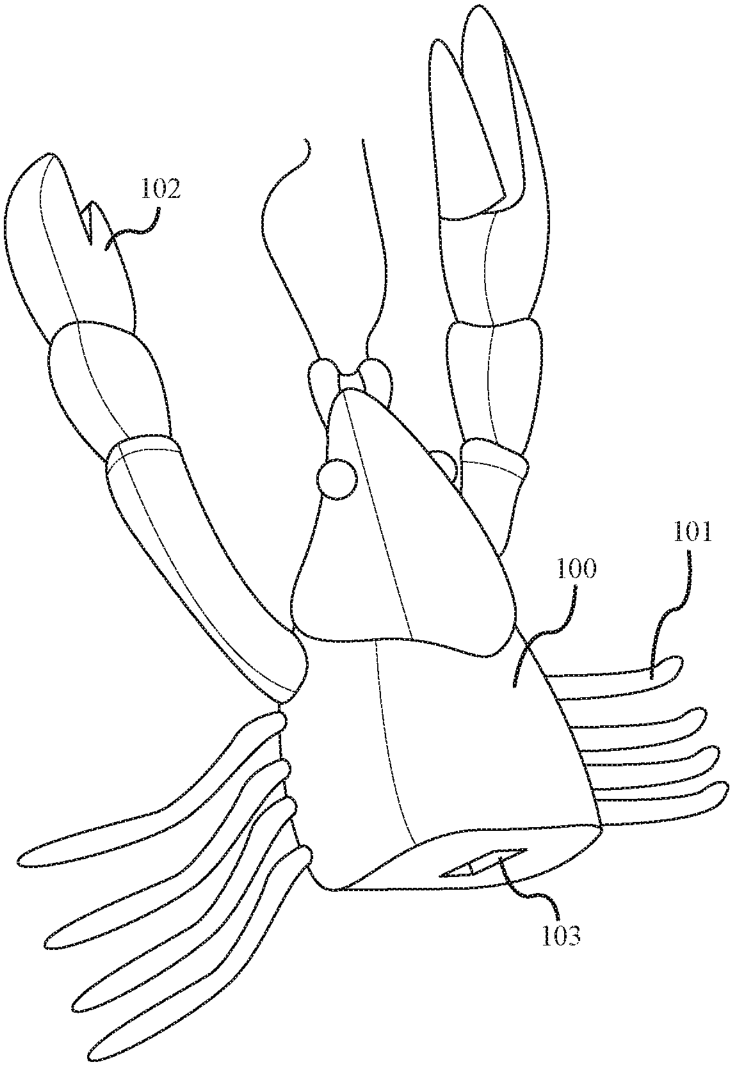
FIG. 6 illustrated the soft body aspects of the lure in accordance with an embodiment of the invention.

FIG. 6 illustrates the soft head segment aspects of the lure showing the detailed construction of soft head segment 100 with legs 101, claws 102, and clip hole 103 in accordance with an embodiment of the invention. This figure demonstrates the realistic detailing that mimics natural prey characteristics, including anatomical features such as claws, legs, and segmented body sections that enhance the lure's fish-attracting appearance with characteristics resembling naturally present organisms. The flexible construction allows for realistic movement that mimics the natural swimming and escape behaviors of prey species while maintaining compatibility with the press-fit attachment mechanism to the hard tail segment.

The preferred embodiment of the hybrid fishing lure comprises a two-segment construction featuring a hard tail segment integrated with a soft head segment. In various alternative embodiments, the hard portions of the hybrid fishing lure and soft portions of the hybrid fishing lure may be reversed or otherwise reconfigured to achieve alternative desired characteristics in the lure configuration. This innovative design achieves the presentation of soft plastic with the function of a hard plastic, effectively marrying the realism benefits of a soft crawdad bait with the benefits of a (hard) crank bait.

In the preferred embodiment, the hybrid fishing lure consists of two primary components: a hard tail segment and a soft head segment that are configured to operate as a unified lure system.

The hard tail segment serves as the primary structural and functional component of the preferred embodiment. This segment incorporates a diving lip that is integrally formed as part of the hard segment body. The lip includes an aperture specifically designed for fishing line attachment, enabling the angler to control the lure's diving and suspension characteristics.

The hard tail segment provides the essential crankbait functionality, including controlled float and sink characteristics based on the tension applied to the fishing line. Without tension, the lure will float, while applying tension to the line causes the lip to engage and suspend the lure at a lower level in the water column. Additionally, the hard tail segment generates the beneficial side-to-side motion during retrieval that is characteristic of crankbaits and provides a more realistic representation of natural prey movement.

The soft head segment of the preferred embodiment provides the realistic appearance and natural movement characteristics that are typically associated with soft plastic lures. The soft segment is constructed to fit over the hard tail segment using a press-on attachment mechanism with a flared connection design. This attachment method ensures secure coupling between the segments while maintaining the unified operation of the complete lure.

The flexible nature of the soft segment of the lure allows for realistic movement that mimics the natural swimming and escape behaviors of prey species, while the hybrid design includes hard aspects that provide advantages associated with rigid lures more generally.

The preferred embodiment is configured with specific dimensional relationships to optimize both functionality and realistic presentation. In a medium-size configuration, the hybrid lure measures approximately 1 inch wide by 3 inches long. The preferred embodiment may also be scaled to provide small and large size variants while maintaining the proportional relationships between the hard and soft segments.

While the preferred embodiment is specifically configured as a crawdad-shaped lure to take advantage of the natural side-to-side motion that realistically represents crawdad movements, the inventive concept extends to alternative embodiments. These may include configurations shaped as shad, bluegills, shrimp, squid, mullet, and other baitfish, each maintaining the primary hard segment and secondary soft segment construction.

The preferred embodiment operates by combining the controlled diving and suspension capabilities of traditional crankbaits with the realistic movement characteristics of soft plastic lures. The hard tail segment with its integrated lip provides the mechanical functionality for depth control and side-to-side motion generation, while the soft head segment contributes the natural appearance and flexible movement that fish find attractive.

This dual-functionality design eliminates the compromise that anglers previously faced between lure control and realistic presentation, providing both the functional benefits of hard plastic lures and the visual realism of soft plastic lures in a single, integrated fishing lure system.

The hard tail segment serves as the primary structural component of the hybrid fishing lure, constructed from suitable hard plastic materials that provide structural integrity and buoyancy while remaining compatible with diving lip functionality and corrosion-resistant for marine environments. The lip is integrally formed as part of the hard segment body, eliminating the need for separate attachment mechanisms and ensuring structural continuity. The lip incorporates an aperture specifically dimensioned for fishing line attachment, with the aperture positioned to optimize the lure's diving characteristics and side-to-side motion generation. In the preferred medium-size embodiment measuring 1 inch wide by 3 inches long, the lip extends from the front of the hard segment at an angle calculated to produce the desired diving depth and wobbling action during retrieval. The hard segment provides functional integrity for hook attachment and generates the beneficial side-to-side motion that provides a more realistic representation of crawdads, which naturally exhibit movement. Without tension applied to the fishing line, the hard segment's buoyancy characteristics cause the lure to float, while applying tension engages the lip to suspend the lure at a lower level in the water column.

The soft head segment comprises the secondary component constructed from flexible plastic materials that allow detailed molding of anatomical features while providing realistic movement characteristics. These materials are specifically selected to be compatible with secure attachment to the hard segment while maintaining the flexibility necessary for natural swimming motion simulation. The soft segment is configured with internal dimensions that accommodate the rear portion of the hard tail segment, creating a press-fit attachment mechanism. The attachment interface incorporates a flared design where the soft segment fits over the hard segment and presses onto it, with the flared connection expanding to create a secure mechanical bond. This flared design ensures that the soft segment remains securely attached during the dynamic forces encountered during casting, retrieval, and landing a fish while allowing the flexible material to move realistically in a manner similar to natural organisms. The soft segment includes realistic detailing that mimics natural prey characteristics, including anatomical features such as claws, legs, and segmented body sections that enhance the lure's fish-attracting appearance with characteristics resembling naturally present organisms.

The connection interface between the hard and soft segments represents a critical aspect of the invention's functionality, requiring precise dimensional relationships to ensure both secure attachment and proper operation. The interface is designed with specific tolerances that allow the soft segment to slide over the rear portion of the hard segment with sufficient resistance to create the press-fit connection. The extension of the tail portions beneath the attachment point in accordance with an embodiment provides secure attachment point for hooks and provides additional support for the soft segment of the lure that sit on top of it. The flared connection mechanism in accordance with an embodiment expands the soft segment material around the hard segment and the plank underlying the soft head portion, to create multiple contact points that distribute attachment forces and prevent separation during use. The dimensional specifications of the connection interface maintain proportional relationships as the lure is scaled to small and large size variants, with the connection zone typically representing approximately 15-25% of the overall lure length to ensure adequate attachment surface area. The secure coupling achieved through this connection interface ensures unified lure operation where both segments move as a single unit for diving and suspension control while allowing the soft segment's independent flexible movement to provide realistic swimming action.

The materials selected for the hard tail segment in accordance with the preferred embodiment must provide the necessary structural integrity and buoyancy characteristics essential for crankbait functionality while maintaining compatibility with the diving lip design and resistance to corrosion in marine environments. Suitable hard plastic materials include high-density polyethylene, polypropylene, or ABS plastic, each offering the required combination of rigidity, buoyancy control, and durability for repeated casting and retrieval operations. The material selection must account for the specific gravity requirements that enable the lure to float without line tension while providing sufficient density to achieve proper suspension behavior when tension is applied. Additionally, the hard plastic material must be capable of withstanding the mechanical stresses generated during the side-to-side motion that creates the realistic crawdad presentation. The material must also be compatible with standard molding processes that allow for precise formation of the integrated lip structure and the aperture for fishing line attachment. Corrosion resistance is particularly important as the lure will be exposed to both freshwater and saltwater environments, requiring materials that maintain their structural properties and surface finish over extended periods of use.

The soft head segment requires flexible plastic materials that provide realistic movement characteristics while allowing for detailed molding of anatomical features such as claws, legs, and segmented body sections. Suitable materials include thermoplastic elastomers, soft vinyl plastics, or silicone-based compounds that offer the necessary flexibility for natural swimming motion simulation while maintaining sufficient durability for the press-fit attachment mechanism. The material must exhibit appropriate shore hardness values, typically in the range of 20-40 Shore A durometer, to provide the realistic movement while maintaining the structural integrity necessary for secure attachment to the hard tail segment. The soft material must also be compatible with the flared connection design, requiring sufficient elasticity to expand during the press-fit attachment process and maintain consistent contact pressure against the hard segment surface. Color stability and the ability to accept detailed surface textures are important material characteristics that contribute to the lure's fish-attracting appearance. The soft segment material must also be chemically compatible with the hard segment material to prevent degradation at the connection interface over time.

The standard dimensions for the hybrid fishing lure are established with a medium size configuration measuring 1 inch wide by 3 inches long, providing the foundational proportional relationships for the two-segment construction.

These dimensions represent the optimal balance between realistic prey size presentation and the functional requirements of both the hard tail segment's crankbait capabilities and the soft head segment's movement characteristics. The medium size serves as the baseline for proportional scaling to create the small and large size variants, maintaining consistent performance characteristics across the size range while accommodating different fishing applications and target species preferences.

The size range encompasses small, medium, and large variants, each maintaining proportional scaling relationships that preserve the invention's functional characteristics. The small size variant typically scales to approximately 70-80% of the medium size dimensions, suitable for finesse applications and targeting smaller fish species. The large size variant scales to approximately 120-140% of the medium size dimensions, appropriate for targeting larger predatory fish and applications requiring increased visibility or attractant presence. The dimensional relationships between the hard and soft segments remain consistent across all size variations, with the hard tail segment typically comprising 40-50% of the overall lure length and the soft head segment comprising the remaining 50-60%. This proportional relationship ensures that the hard segment provides adequate structural support and buoyancy control while allowing sufficient soft segment length for realistic movement presentation.

The component proportions are critical to achieving the invention's dual functionality, requiring specific ratios between the front hard segment and back soft segment to optimize both crankbait performance and realistic appearance. The lip dimensions are scaled relative to the overall lure size, with the lip length typically representing 15-25% of the total lure length to achieve proper diving characteristics while maintaining the side-to-side motion that provides realistic crawdad representation. The lip width generally matches the maximum body width of the hard segment to ensure proper water flow and vibration generation. The connection interface dimensional specifications require precise tolerances to ensure reliable attachment while accommodating the manufacturing variations inherent in both hard and soft plastic molding processes. The overlap zone between segments typically extends 8-12% of the total lure length, providing adequate surface area for the press-fit and flared connection mechanism. The internal diameter of the soft segment at the connection interface is dimensioned with appropriate clearance to accommodate the hard segment's outer diameter while maintaining sufficient interference fit for secure attachment during dynamic loading conditions encountered during fishing operations.

An embodiment utilizes a crawdad configuration that leverages the invention's core two-segment construction to replicate the natural anatomy and movement characteristics of crawfish, which represent a primary food source for many gamefish species. The crawdad configuration incorporates detailed anatomical replication within both the hard tail segment and soft head segment to achieve maximum realism while maintaining the functional advantages of the hybrid design. The hard tail segment in the crawdad embodiment is shaped to replicate the tail and body section of a natural crawdad, with the integrated lip positioned to simulate natural crawdad orientation during backward swimming escape behavior. The soft head segment replicates the crawdad's head. This anatomical configuration accurately reflects natural crawdad locomotion where the tail leads during rapid backward swimming when escaping predators, with the lure's hard tail segment positioned at the front to generate forward motion while mimicking the natural tail-first orientation of escaping crawdads. The segments of the hybrid lure in various embodiments incorporate detailed molding that includes segmented body sections, appendages, and tail features that provide the characteristic flexible movement for realistic swimming motion.

The tail and appendage positioning in the crawdad configuration is specifically designed to replicate the natural swimming and escape behavior of crawdads. The anatomical accuracy of the hard tail segment leading during lure movement directly corresponds to natural crawdad escape mechanics in accordance with an embodiment, where tail contractions propel the animal backward with the tail positioned forward in the direction of movement. The soft head segment includes molded appendages and anatomical details that move independently in the water current, creating realistic movement that mimics how crawdads kick and then pump their tail and with a natural wagging motion during swimming. This biomechanically accurate orientation ensures that the lure's movement profile during retrieval closely replicates the natural appearance and motion patterns that gamefish associate with escaping crawdads, thereby enhancing the lure's effectiveness in triggering predatory responses. The flexible construction of the soft segment allows for natural flexing motion that replicates the powerful tail movements crawdads use for rapid backward swimming when escaping predators. The combination of the hard segment's side-to-side wobbling action with the soft segment's flexible appendage movement creates a comprehensive motion profile that accurately represents crawdad behavior patterns, enhancing the lure's fish-attracting capabilities while maintaining the functional diving and suspension characteristics of the hard tail segment.

Coloration and surface texturing options for the crawdad configuration in an embodiment encompass the natural color variations found in different crawdad species and habitats. The hard tail segment can be molded in colors ranging from natural brown and olive tones to more vibrant orange and red colors that simulate molting crawdads. The soft head segment allows for detailed color matching or contrasting color schemes that enhance visibility while maintaining realism. Surface texturing includes natural segmentation lines, surface bumps and ridges that simulate the natural exoskeleton texture, and subtle color gradations that replicate the natural appearance variations found in live crawdads. Both segments can incorporate translucent or semi-translucent materials that provide lifelike appearance characteristics while maintaining the necessary structural properties for the press-fit connection mechanism.

The alternative embodiments extend the inventive concept to other baitfish configurations while maintaining the fundamental two-segment construction with soft tail segment and hard head segment. The shad configuration adapts the basic design principles to replicate the streamlined body shape and swimming characteristics of shad species, with the soft tail segment in such configuration shaped to incorporate the head and front body portion of a shad, including the distinctive compressed body profile and integrated lip positioned to optimize the diving and suspension characteristics for this body shape. The hard head segment in the shad configuration replicates the rear body section and tail area, with appropriate scaling and fin details molded to provide realistic movement during retrieval while maintaining the secure press-fit and flared connection to the hard segment.

The bluegill configuration represents another alternative embodiment that adapts the two-segment design to replicate the distinctive body shape and coloration patterns of bluegill and other panfish species. The soft tail segment in such configuration incorporates the characteristic deep body profile of bluegills with appropriate lip design modifications to accommodate the different hydrodynamic characteristics of this body shape while maintaining the controlled float and sink functionality. The hard head segment in such configuration includes the distinctive tail fin configuration and body tapering that provides natural swimming motion simulation specific to bluegill movement patterns.

Other baitfish configurations in embodiments of the invention encompass additional prey species representations including bass, trout, perch, shrimp, squid, mullet and regional forage fish species, each maintaining the core two-segment construction while adapting the specific anatomical details and proportional relationships appropriate to the target species. The scalable design principles for various prey species establish consistent engineering approaches for adapting the basic invention to different fish types while preserving the fundamental functionality that provides the presentation of soft bait material with the function of a hard bait material. These design principles maintain the proportional relationships between hard and soft segments, ensure appropriate lip sizing and positioning for each body configuration, and preserve the connection interface specifications across all embodiments while allowing for species-specific anatomical details and movement characteristics that enhance the realistic presentation for each particular prey type.

The terminology and anatomical orientation described herein generally applies to crawdad configurations where the hard tail segment represents the crawdad's tail portion and leads during swimming motion, while the soft head segment represents the crawdad's head portion. For alternative fish embodiments, including bass, perch, shad, and other forward-swimming baitfish species, the anatomical designation would be reversed, with the hard front segment representing the fish's head portion and the soft rear segment representing the fish's tail portion. However, the physical construction remains consistent across all embodiments, with the hard segment positioned at the front of the lure containing the diving lip, and the soft segment positioned at the rear of the lure providing flexible movement characteristics. This anatomical designation approach ensures accurate representation of natural swimming behavior for each prey species type while maintaining consistent manufacturing and functional specifications.

The functional operation of the hybrid fishing lure embodiment encompasses both the buoyancy control characteristics derived from the hard tail segment and the realistic movement characteristics provided by the soft head segment, working together to achieve a primary objective of the invention, namely providing the presentation of soft plastic with the function of a hard plastic. The buoyancy control system operates through the hard tail segment's material density and integrated lip design, creating distinct operational modes based on fishing line tension application. Without tension applied to the fishing line, the lure exhibits natural float characteristics where the hard segment's buoyancy properties cause the entire lure to remain at or near the water surface. This floating behavior allows anglers to present the lure in shallow water applications and provides the opportunity to work the lure over submerged vegetation or structure without snagging.

When tension is applied to the fishing line, in embodiments of the invention the integrated lip of the hard tail segment engages with the water flow, causing the lure to dive and suspend at a lower level in the water column. The diving depth control is directly related to the lip design characteristics, including the lip angle, length, and width relative to the overall lure dimensions. The lip functions similarly to traditional crankbaits where the length of the lip determines the diving depth, with the specific lip geometry calibrated to achieve optimal diving performance while maintaining the side-to-side motion generation that provides realistic crawdad representation. The suspension behavior under line tension allows anglers to maintain the lure at specific depths in the water column by modulating the tension applied to the fishing line, creating precise depth control that is characteristic of hard plastic crankbaits but unavailable with traditional soft plastic lures.

The movement characteristics in embodiments of the invention combine the mechanical motion generation of the hard tail segment with the natural swimming action of the soft head segment to create a comprehensive motion profile that mimics natural prey behavior. The side-to-side motion generation in accordance with an embodiment originates from the hard segment's lip design and body shape, creating the wobbling action that is a function of the bill and provides a more realistic representation of crawdads that naturally "wag" as they kick and pump their tail. This side-to-side motion is transmitted through the connection interface to influence the movement of the soft head segment, creating a coordinated movement pattern that combines the mechanical wobble of the hard segment with the flexible swimming action of the soft segment.

The realistic swimming action of the soft segment in an embodiment occurs independently of the hard segment's mechanical motion, allowing the flexible material to respond to water flow and current in a natural manner. The soft segment's anatomical details, including tail sections, appendages, and surface textures, move independently in response to the water displacement created by the lure's forward motion and the side-to-side wobble generated by the hard segment. The combined motion profile during retrieval integrates these movement characteristics to create a presentation that exhibits both the controlled diving and wobbling action of traditional crankbaits with the natural swimming motion of soft plastic lures, effectively solving the problem of having to choose between lure functionality and realistic presentation.

The preferred method of use in accordance with an embodiment begins with proper rigging instructions that ensure optimal performance of both the hard and soft segments. Line attachment to the lip aperture requires standard fishing line tied directly to the aperture molded into the integrated lip of the hard tail segment. The line attachment point is positioned to optimize the lure's diving characteristics and ensure proper transmission of angler input to the lure's motion generation systems. Hook placement considerations for optimal performance must account for the two-segment construction and the specific anatomical features of the chosen embodiment, whether crawdad, shad, bluegill, or other baitfish configuration. For crawdad configurations, hook placement should accommodate the natural impact point for fish attacking crawdads, typically targeting the body section rather than appendages. The hook size and style should be selected based on the lure size variant, with appropriate gap width to accommodate the hard segment's body thickness while ensuring proper hook penetration during the hook set.

Weight addition options in embodiments of the invention are achieved through modular soft segment variations rather than external weight systems. For specific fishing situations where additional sinking rate or deeper depth exploration is desired, heavier versions of the soft head segment can be manufactured and interchanged with the same hard tail segment body. This modular approach allows anglers to easily switch out the soft section to modify the lure's overall weight characteristics while maintaining the same hard shell body with its optimized buoyancy and diving lip design. The weighted soft segment variants preserve the lure's balance and side-to-side motion characteristics essential to the invention's functionality, as the weight distribution remains integrated within the lure's structure rather than requiring external modifications to the fishing line setup.

Fishing technique applications encompass various water conditions and fishing scenarios that leverage both the dual functionality of the hybrid design and the modular weight system capabilities in accordance with an embodiment. Shallow water applications utilize standard soft segments with the lure's floating characteristics to work over vegetation and structure while applying intermittent line tension to achieve diving action when desired. Deep water exploration techniques employ heavier soft segment variants that can be interchanged with the same hard tail segment, allowing anglers to reach greater depths while maintaining the realistic presentation provided by the soft segment construction. This modular system enables the same hard segment to function effectively across different depth ranges by simply switching the soft segment component, providing versatility for changing fishing conditions while preserving the unified operation and realistic movement characteristics that define the invention's core functionality.

Cover deflection capabilities in accordance with an embodiment leverage the hard tail segment's structural integrity to deflect off rocks, stumps, and other underwater obstacles, similar to traditional crankbaits with square bill designs that are preferred for deflecting off of large cover like stumps and rocks. The hard segment in accordance with an embodiment protects the soft segment from damage during contact with structure while maintaining the lure's functionality and appearance. Retrieval methods for maximum effectiveness should vary based on fishing conditions and target species behavior, ranging from steady retrieves that emphasize the side-to-side wobbling action to stop-and-go techniques that allow the soft segment's natural movement to attract fish during pause periods.

Environmental considerations in embodiments of the invention guide the selection of specific lure variants and fishing techniques based on water conditions and fishing scenarios. Water clarity applications consider the enhanced visibility provided by the realistic soft segment movement in clear water conditions, where the natural swimming action provides significant advantages over hard lures that appear unnatural to wary fish. In stained or murky water conditions, the side-to-side motion generated by the hard segment creates vibration and water displacement that helps fish locate the lure, similar to traditional crankbait applications in low-visibility conditions. Structure fishing applications utilize the lure's deflection capabilities and precise depth control to work complex underwater terrain effectively, while the realistic appearance of the soft segment provides natural presentation when fish are holding tight to cover.

Seasonal usage recommendations in embodiments of the invention account for changing fish behavior and water conditions throughout the year, with the hybrid lure's versatility allowing effective application across various seasonal conditions. During pre-spawn periods when fish are actively feeding, the combination of realistic appearance and aggressive wobbling action can trigger strikes from fish in various moods. Post-spawn applications may emphasize the subtle movement of the soft segment when fish are less aggressive, while maintaining the depth control capabilities necessary to reach fish in specific holding areas. Target species considerations guide the selection of appropriate size variants and embodiment configurations, with crawdad configurations particularly effective for bass, walleye, and other crawdad-feeding species, while shad and bluegill configurations target species that primarily feed on these baitfish types.

The alternative embodiments and modifications of the hybrid fishing lure extend the inventive concept through various structural variations and enhancement features that maintain the fundamental two-segment construction while providing additional functionality and customization options. These modifications demonstrate the versatility of the basic design principles while preserving the core benefit of providing the presentation of soft plastic lure characteristics with the beneficial functions of a hard plastic incorporated into the lure.

Alternative connection methods between segments in embodiments of the invention offer variations on the basic press-fit and flared design to accommodate different manufacturing processes, material combinations, or performance requirements. These alternative connection methods include threaded connections where the hard segment incorporates external threading and the soft segment includes corresponding internal threading, allowing for secure attachment with the ability to disassemble and reassemble the segments as needed. Bayonet-style connections provide quick attachment and detachment through a twist-lock mechanism, where the hard segment includes protruding tabs that align with corresponding slots in the soft segment, allowing quarter-turn attachment that locks the segments together. Snap-fit connections utilize flexible tabs molded into either segment that engage with corresponding recesses, providing audible and tactile confirmation of proper attachment while maintaining the ability to separate the segments for maintenance or replacement.

Modular segment replacement options enable the interchangeability of different soft segment configurations with a single hard segment in accordance with embodiments, allowing anglers to adapt the lure presentation to changing fishing conditions or target species preferences. This modular approach maintains the dimensional specifications of the connection interface while allowing soft segments of different anatomical configurations, colors, or sizes to be attached to the same hard segment base. The modular system requires standardized interface dimensions across all soft segment variants to ensure consistent attachment and performance characteristics. Replacement soft segments can include seasonal color variations, different prey species configurations, or segments with varying flexibility characteristics to modify the swimming action based on fishing conditions.

Adjustable lip configuration embodiments in accordance with alternative examples provide the ability to modify the diving characteristics and side-to-side motion generation of the hard tail segment to optimize performance for specific fishing applications. These adjustable systems may include removable lip inserts that allow different lip angles, lengths, or shapes to be installed in the hard segment body, providing customizable diving depth and wobbling action characteristics. Alternative adjustable lip designs incorporate hinged mechanisms that allow the lip angle to be modified through user adjustment, enabling the same lure to function effectively at different diving depths. Modular lip systems utilize quick-change mechanisms similar to the segment connection interface, allowing different lip configurations to be swapped based on fishing conditions while maintaining the structural integrity necessary for proper lure operation.

Enhancement features expand the sensory attraction capabilities of the hybrid lure embodiment of the invention through integration of additional fish-attracting elements while preserving the fundamental two-segment functionality. Rattle chamber integration possibilities leverage the hollow body design concept similar to existing soft plastic lures where the hollow body allows for the addition of rattles to create more sound and vibration. In the hybrid lure design, rattle chambers can be incorporated within the hard tail segment, providing sound generation that complements the visual attraction of the realistic soft segment and the side-to-side motion of the hard segment. The rattle chamber design must account for the buoyancy characteristics of the hard segment, ensuring that the added weight of rattle components does not interfere with the float and suspension characteristics essential to the invention's functionality. Sealed rattle chambers within the hard segment provide durability and consistent sound generation while maintaining the water-tight integrity necessary for proper buoyancy control.

Scent retention capabilities in the soft segment in embodiments of the invention take advantage of the porous nature of certain soft plastic materials to absorb and slowly release fish-attracting scents over extended periods of use. The soft segment material selection can be modified to incorporate scent-retention additives or surface treatments that enhance the material's ability to hold and disperse attractant compounds. Alternatively, the soft segment design can include small reservoirs or channels that hold liquid attractants and release them gradually through controlled openings or permeable materials. These scent retention systems must maintain the flexibility and movement characteristics essential to the soft segment's realistic presentation while providing sustained scent dispersal that enhances the lure's fish-attracting capabilities.

Color-changing or UV-reactive materials in embodiments of the invention expand the visual attraction capabilities of both the hard and soft segments through responsive materials that modify their appearance based on environmental conditions. Photochromic materials incorporated into either segment provide color changes in response to light conditions, allowing the lure to adapt its visibility characteristics as light levels change throughout the day or at different water depths. UV-reactive materials enhance visibility in low-light conditions or deep water applications where ultraviolet light penetration provides illumination not visible to anglers but detectable by fish. Thermochromic materials offer color changes in response to water temperature variations, providing seasonal adaptation capabilities that can enhance fish attraction during temperature transitions. These responsive materials must maintain the structural and flexibility characteristics required for their respective segments while providing the enhanced visual attraction capabilities that complement the invention's realistic movement and functional operation characteristics.

The detailed description provided herein demonstrates that the present invention successfully achieves its objective of combining the functional advantages of hard plastic crankbaits with the realistic presentation benefits of soft plastic lures in a single, integrated fishing lure system. The two-segment construction, precise dimensional relationships, material specifications, and connection interface design provide enabling disclosure sufficient for a person skilled in the art to make and use the invention without undue experimentation. The various embodiments, alternative configurations, and enhancement features illustrate the versatility and adaptability of the inventive concept while maintaining the core functionality that solves the fundamental problem of having to choose between lure control and realistic fish presentation. Through the comprehensive enabling disclosure provided, the hybrid fishing lure represents a significant advancement in fishing lure technology that addresses long-standing limitations in conventional lure designs and provides anglers with a superior tool for fish attraction and capture across diverse fishing applications and environmental conditions.

A second embodiment of the hybrid fishing lure provides reverse buoyancy characteristics that more closely mimic natural crawdad movement patterns. In this embodiment, the hard tail segment is constructed with materials or internal weighting that causes the lure to sink when at rest in the absence of line tension. However, when line tension is applied during retrieval, the integrated lip design causes the lure to dive upward through the water column, contrary to traditional crankbait behavior. When retrieval stops and line tension is released, the lure sinks again, replicating the natural sinking behavior of crawdads not in active retreat. This reverse buoyancy system provides a more realistic presentation of crawdad behavior while maintaining the fundamental two-segment construction and connection interface specifications described in the primary embodiment.

The reverse buoyancy characteristics are achieved through specific material selection and internal construction of the hard tail segment. The segment may incorporate internal weighting elements positioned to create negative buoyancy while maintaining the structural integrity necessary for the integrated lip functionality. The lip design in this embodiment is configured with appropriate angle and surface area to generate sufficient upward force during retrieval to overcome the negative buoyancy and cause upward diving motion. The soft head segment maintains the same flexible construction and press-fit attachment mechanism as the primary embodiment, ensuring consistent realistic movement characteristics across all embodiments.

A third embodiment moves the line attachment point to the most central and dorsal point integrating a hinged tail component. In accordance with a preferred use, the angler's intermittent retrieve even more accurately mimics natural crawdad body positioning and escape behavior. This hinged embodiment allows the hard tail segment to flip under the rest of the lure during retrieval, simulating the natural tail-under-body position that crawdads assume when escaping from predators. When line tension is released, the lure sinks and the hard tail extends to full length, replicating the natural extended position of crawdads at rest on the bottom.

The hinged connection mechanism comprises a pivot joint integrated into the hard tail portion. The pivot joint allows controlled rotation of the hard tail segment relative to the more central aspect of the hard segment and soft head segment while maintaining secure attachment. The hinge mechanism is designed with appropriate resistance to ensure the segment maintains proper positioning during both the folded and extended positions. During retrieval with line tension applied, the water flow and diving action of the hard segment causes the leading tail segment to fold under the rest of the body through the hinge mechanism. When tension is released, the natural buoyancy characteristics and weight distribution cause the rotating tail segment to extend to full length as the lure sinks. In an enhanced embodiment, a spring mechanism is integrated within the hinge connection to assist in extending the tail segment to its full length position. The spring mechanism comprises a torsion spring positioned at the pivot joint between the hard front segment and the hinged tail portion, with the spring configured to bias the tail segment toward the extended position. The spring provides controlled rotational force that supplements the natural buoyancy and weight distribution effects, ensuring reliable extension of the tail segment when line tension is released while allowing the tail to fold under the body against the spring bias when water flow forces are applied during retrieval. The spring mechanism is dimensioned with appropriate spring constant and preload to provide sufficient extension force without interfering with the folding action during active retrieval. In an exemplary embodiment the spring mechanism is constructed from corrosion-resistant materials suitable for freshwater and saltwater environments.

The fishing technique for the hinged embodiment involves intermittent line manipulation rather than continuous retrieval. Anglers apply tension to cause the tail to flip under the body, then release tension to allow the lure to fall to the lake bottom with the tail extended. This technique provides a slower, more realistic presentation that closely mimics natural crawdad behavior patterns. The intermittent pull-and-release method creates a stop-and-go action that triggers predatory responses while maintaining the realistic appearance provided by the soft segment construction.

All three embodiments utilize a modular system where the soft crawdad portions, including the head, legs, claws, and attachment mechanisms, remain consistent across all hard body configurations. This interchangeability allows the same soft segments to be used with different hard body options, providing versatility in presentation while maintaining manufacturing efficiency. The standardized connection interface dimensions ensure that soft segments of different colors, sizes, or anatomical configurations can be attached to any of the hard segment variants, enabling customization based on fishing conditions and angler preferences.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

I claim:

1. A fishing lure comprising:

a first segment constructed from a first material having a first flexibility characteristic and including an integrated diving lip with an aperture for fishing line attachment; and a second segment constructed from a second material having a second flexibility characteristic different from the first flexibility characteristic, said second segment configured to attach to said first segment through a connection mechanism comprising a plank connector and a clip piece, wherein the plank connector underlies a portion of the second segment and cooperates with the clip piece to define multiple contact points across a connection interface between the first and second segments;

wherein one of said first and second segments comprises rigid plastic material that provides buoyancy control characteristics, and wherein the integrated diving lip generates side-to-side motion during retrieval, and the other of said first and second segments comprises flexible plastic material that provides realistic movement characteristics.

2. The fishing lure of claim 1, wherein the first segment comprises the rigid plastic material and the second segment comprises the flexible plastic material.

3. The fishing lure of claim 2, wherein the rigid plastic first segment provides buoyancy control characteristics that cause the lure to float without fishing line tension and suspend at a lower level in water when tension is applied to the fishing line, with diving depth controlled by the geometric characteristics of the integrated diving lip including lip angle, length, and width.

4. The fishing lure of claim 1, wherein the connection mechanism comprises a press-fit attachment with a flared connection design configured to distribute attachment forces across the connection interface to prevent segment separation during use.

5. The fishing lure of claim 1, wherein the flexible plastic segment includes anatomical detailing that mimics natural prey characteristics selected from the group consisting of claws, legs, appendages, and segmented body sections.

6. The fishing lure of claim 1, wherein the rigid plastic segment is constructed from material selected from the group consisting of high-density polyethylene, polypropylene, and ABS plastic.

7. The fishing lure of claim 1, wherein the flexible plastic segment is constructed from material selected from the group consisting of thermoplastic elastomers, soft vinyl plastics, and silicone-based compounds having a shore hardness of 20-40 Shore A durometer.

8. The fishing lure of claim 1, wherein the lure is configured to replicate a prey species selected from the group consisting of crawdad, shad, bluegill, shrimp, squid, and baitfish.

9. The fishing lure of claim 2, wherein the rigid first segment comprises the tail portion of a crawdad configuration and the flexible second segment comprises the head portion with appendage features, and wherein the integrated diving lip is positioned to simulate the natural tail-first orientation of a crawdad during backward swimming escape behavior.

10. The fishing lure of claim 1, wherein the rigid plastic segment comprises an internal air chamber constructed to maintain watertight integrity and to preserve buoyancy characteristics that enable the tension-responsive float and suspension behavior of the lure.

11. The fishing lure of claim 1, wherein the flexible plastic segment is interchangeable with alternative flexible segments of different weights to modify the lure's sinking characteristics while using the same rigid segment, wherein said interchangeability is provided through a standardized connection interface that allows flexible segments of different weights to be selectively attached to the rigid segment to modify sinking rate and depth exploration characteristics without modifying the rigid segment or its diving lip geometry.

12. The fishing lure of claim 1, further comprising a hook attachment point on the rigid segment.

13. The fishing lure of claim 1, wherein the connection interface between the first and second segments is defined by the plank connector underlying a portion of the flexible plastic segment and the clip piece engaging the flexible plastic segment at a location spaced from the plank connector, such that the plank connector and the clip piece cooperate to resist separation of the first and second segments during retrieval of the fishing lure.

14. The fishing lure of claim 1, further comprising one or more rattle chambers integrated within the rigid segment, wherein each of the one or more rattle chambers is sealed to maintain watertight integrity of the rigid segment while generating sound and vibration during retrieval without interfering with the buoyancy control characteristics of the rigid segment.

15. The fishing lure of claim 1, wherein the flexible plastic segment incorporates scent retention capabilities through at least one of scent-retention additives, surface treatments, or internal reservoirs configured to absorb and release fish-attracting scents during use.

16. The fishing lure of claim 1, wherein at least one of the first and second segments incorporates UV-reactive material configured to modify the visual appearance of the lure in response to ultraviolet light conditions.

* * * * *